United States Patent [19]
Komatsu et al.

[11] Patent Number: 5,442,503
[45] Date of Patent: Aug. 15, 1995

[54] DISK DRIVER HAVING A DISK HOLDER TABLE WITH A HOLDER RING

[75] Inventors: Hisateru Komatsu; Takashi Watanabe, all of Yamagata, Japan

[73] Assignee: Mitsumi Electric Co., Ltd., Tokyo, Japan

[21] Appl. No.: 269,152

[22] Filed: Jun. 30, 1994

[30] Foreign Application Priority Data

Sep. 29, 1993 [JP] Japan .............................. 5-052650 U

[51] Int. Cl.⁶ ............................................ G11B 5/016
[52] U.S. Cl. ................................................. 360/99.05
[58] Field of Search .............. 360/98.08, 99.05, 99.12, 360/99.08

[56] References Cited

U.S. PATENT DOCUMENTS 4,758,915 7/1988 Sakaguchi ..................... 360/99.05
5,126,900 6/1992 Munekata ..................... 360/99.05

Primary Examiner—A. J. Heinz
Attorney, Agent, or Firm—Knobbe, Martens, Olson & Bear

[57] ABSTRACT

A disk holder table has a bottom surface to which a holder ring for holding a drive roller is assembled. The holder ring is made of metal and has a generally rectangular shape. The holder ring is engaged by hooks formed on the bottom surface of the disk holder table. The disk holder table has guide portions formed on the bottom surface thereof to restrict the range of rotation of the holder ring in parallel to the bottom surface. The holder ring is urged in a predetermined direction by a rod spring formed on the bottom surface.

4 Claims, 4 Drawing Sheets

DISK DRIVER HAVING A DISK HOLDER TABLE WITH A HOLDER RING

BACKGROUND OF THE INVENTION

This invention relates to a disk driver having a disk holder table for holding a disk such as a magnetic disk and for rotating the disk.

A conventional disk driver has a disk holder table comprising a disk-shaped plastic magnet integrally coupled to a motor shaft fixedly inserted in the center portion of the plastic magnet. A support member is rotatably attached to the bottom surface of the disk holder table by the use of a support pin. The support member is urged by a rod spring outwardly from the center of the disk holder table. The support member has a free end to which a drive roller is rotatably attached through a roller shaft. The drive roller is mounted on the support member in such a manner that the drive roller is upwardly protruded through an aperture formed in the disk holder table.

However, in the above-mentioned conventional disk driver, the support member for holding the drive roller is attached to the bottom surface of the disk holder table by the use of the support pin. With this structure, the number of parts is inevitably increased. In addition, in order to attach the support member to the disk holder table, it is required to caulk the top end of the support pin on the top surface of the disk holder table. This results in increase of the number of assembling steps.

SUMMARY OF THE INVENTION

It is therefore an object of this invention to provide a disk driver which is capable of effectively reducing the number of parts and the number of assembling steps.

A disk driver to which this invention is applicable comprises a disk holder table for holding a disk having a disk hub made of metal and provided with a driving hole formed at a position eccentric with the center of the disk to receive a drive roller therein. According to this invention, the disk holder table comprises a plastic magnet provided with an aperture formed at a position eccentric with the center thereof. The disk holder table has a bottom surface to which a holder ring made of metal and having a generally rectangular shape is assembled to hold the drive roller so that the drive roller is upwardly projected through the aperture. The holder ring is engaged by a pair of hooks formed on the bottom surface of the disk holder table with a space left between the holder ring and the bottom surface of the disk holder table. The holder ring is rotatable in parallel to the bottom surface of the disk holder table within a range restricted by restricting protrusions formed on the bottom surface of the disk holder table. The holder ring is urged in a predetermined direction by a spring member placed on the bottom surface of the disk holder table.

DESCRIPTION OF THE PREFERRED EMBODIMENT

Figure 1:
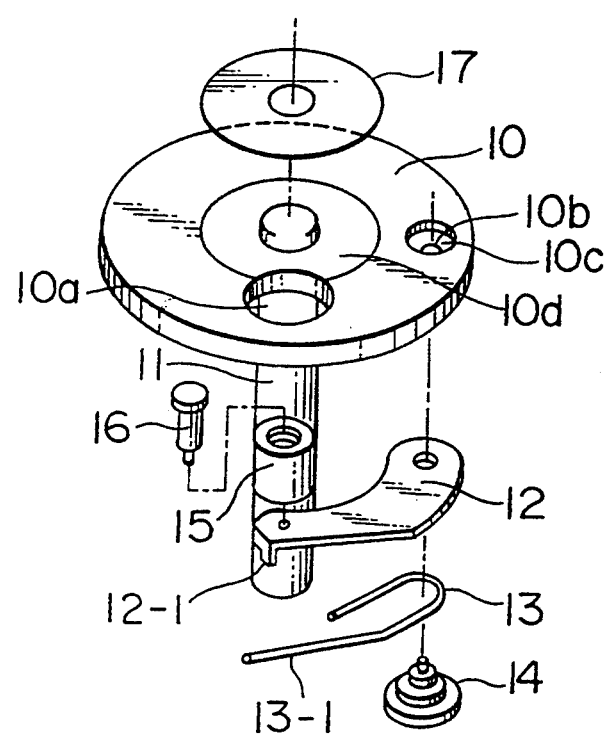
FIG. 1 is an exploded perspective view of a conventional disk holder table and accessories thereof.

Referring to FIG. 1, a conventional disk driver will at first be described for a better understanding of this invention. In FIG. 1, a disk holder table 10 is made from a plastic magnet integrally coupled to a rotation shaft 11 fixedly inserted in the plastic magnet. The rotation shaft 11 is driven by a motor not shown in the figure. A support member 12 is rotatably attached to the bottom surface of the disk holder table 10. Specifically, the support member 12 has one end rotatably supported by a support pin 14 attached to the disk holder table 10. As will later be described, the support member 12 is urged by a rod spring 13 outwardly from the center of the disk holder table 10. The support pin 14 is attached to the disk holder table 10 in the manner which will now be described. Specifically, the top end of the support pin 14 is inserted into a hole 10b formed in the disk holder table 10. A part of the support pin 14 is upwardly protruded from the hole 10b and caulked within a recess 10c formed in the top surface of the disk holder table 10. The support member 12 has a free end to which a drive roller 15 is rotatably attached through a roller shaft 16. The drive roller 15 is mounted on the support member 12 in such a manner that the drive roller is upwardly protruded through an aperture 10a formed in the disk holder table 10.

The disk holder table 10 has a circular protrusion 10d formed at the center portion of the top surface thereof. On the circular protrusion 10d, a circular-shaped resin tape (Teflon tape) is adhered to facilitate sliding of a disk hub made of metal and assembled into a magnetic disk (not shown). The rod spring 13 is assembled to the bottom surface of the support member 12. Specifically, the rod spring 13 has one end fixed to the support member 12 by the support pin 14 and the other end engaged with a hook portion 12-1 formed at the free end of the support member 12. With this structure, the support member 12 is urged by the rod spring 13 to be pivotable in a radial direction of the disk holder table 10. In addition, the rod spring 13 has a deformed part 13-1 which is bent upward to urge the support member 12 in an upward direction also. As is obvious from the foregoing description, the support pin 14 is essential to attach the support member 12 to the disk holder table 10. In addition, a caulking operation is required to fixedly attach the support pin 14 to the disk holder table 10.

Figure 2:
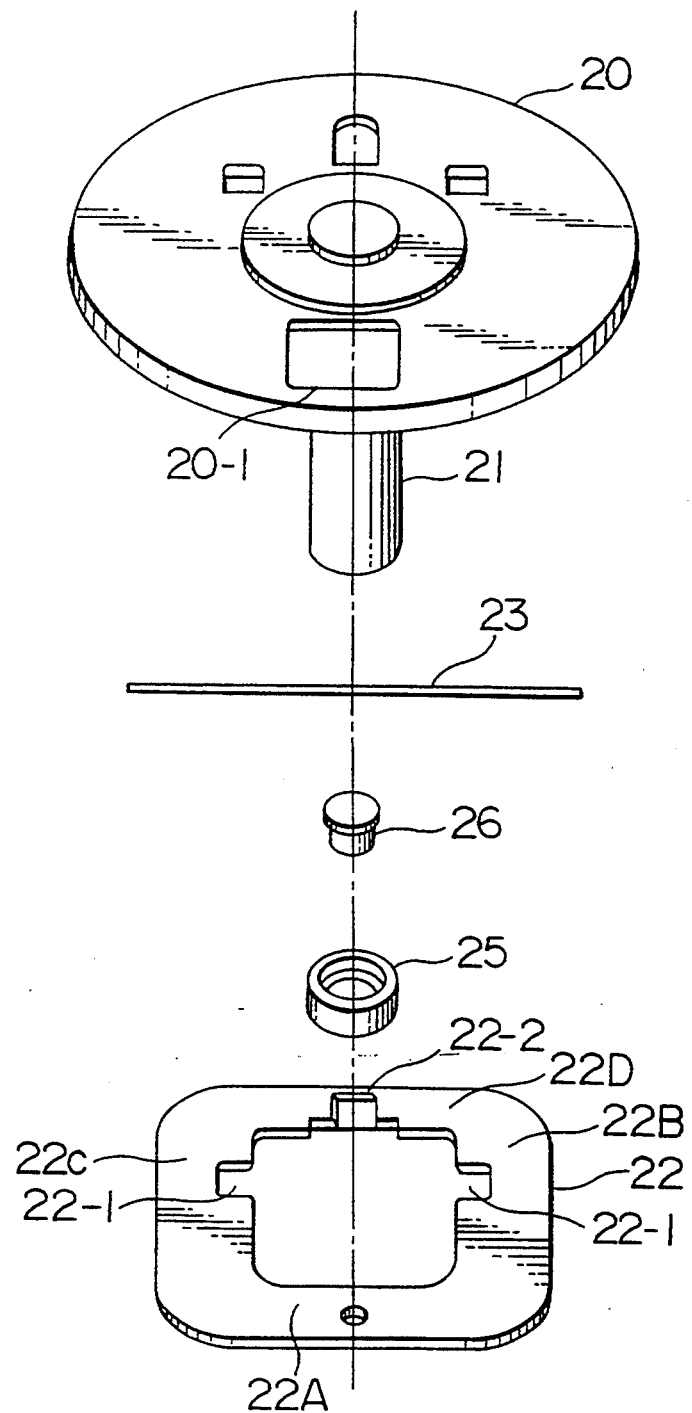
FIG. 2 is an exploded perspective view of a disk holder table and accessories thereof in a disk driver according to this invention.

Referring to FIGS. 2 through 7, description will now be made as regards a disk driver according to a preferred embodiment of this invention. In FIG. 2, a disk holder table 20 is made from a plastic magnet. The upper half and the lower half of the plastic magnet along a thickness direction are separately magnetized to have different magnetic forces different from each other. A holder ring 22 is formed into a generally rectangular shape by punching a metal plate which can be attracted to the bottom surface of the disk holder table 20. The holder ring 22 has four sides which will hereinafter be called a first side 22A, a second side 22B, a third side 22C, and a fourth side 22D for convenience of description. The second and the third sides 22B and 22C are adjacent to the first side 22A, and the fourth side 22D is opposite to the first side 22A. On the first side 22A, a drive roller 25 is supported by a support pin 26 with its rotation axis extending in a vertical direction. The holder ring 22 is assembled to the bottom surface of the disk holder table 20 so that the drive roller 25 is upwardly protruded from an aperture 20-1 formed in the disk holder table 20.

The holder ring 22 has a pair of notches 22-1 formed at internal edges of the second and the third sides 22B and 22C, respectively, in the vicinity of the fourth side 22D. At an internal edge of the fourth side 22D, a protrusion 22-2 is formed by a folding step to protrude towards the bottom surface of the disk holder table 20.

Figure 3:
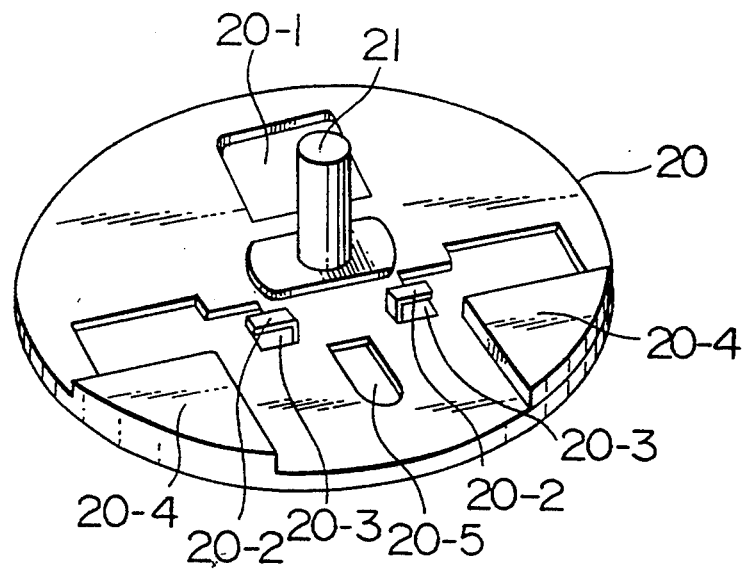
FIG. 3 is a perspective view of the bottom surface of the disk holder table illustrated in FIG. 2.
Figure 5:
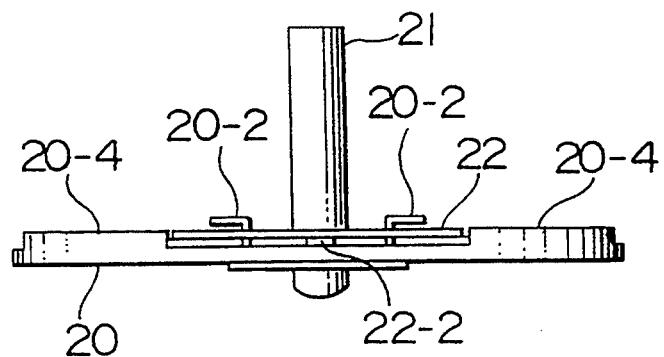
FIG. 5 is a side view of the assembly illustrated in FIG. 4.

Referring to FIG. 3, the disk holder table 20 has a pair of hooks 20-2 of an inverted-L shape formed on the bottom surface of the disk holder table 20 to be engageable with the internal edges of the second and the third sides 22B and 22C of the holder ring 22. As illustrated in FIG. 5, the hooks 20-2 are engaged with the internal edges of the second and the third sides 22B and 22C of the holder ring 22 with a space left between the holder ring 22 and the bottom surface of the disk holder table 20. The hooks 20-2 are formed during a molding step of the disk holder table 20. A pair of holes 20-3 are also formed during the molding step.

Figure 4:
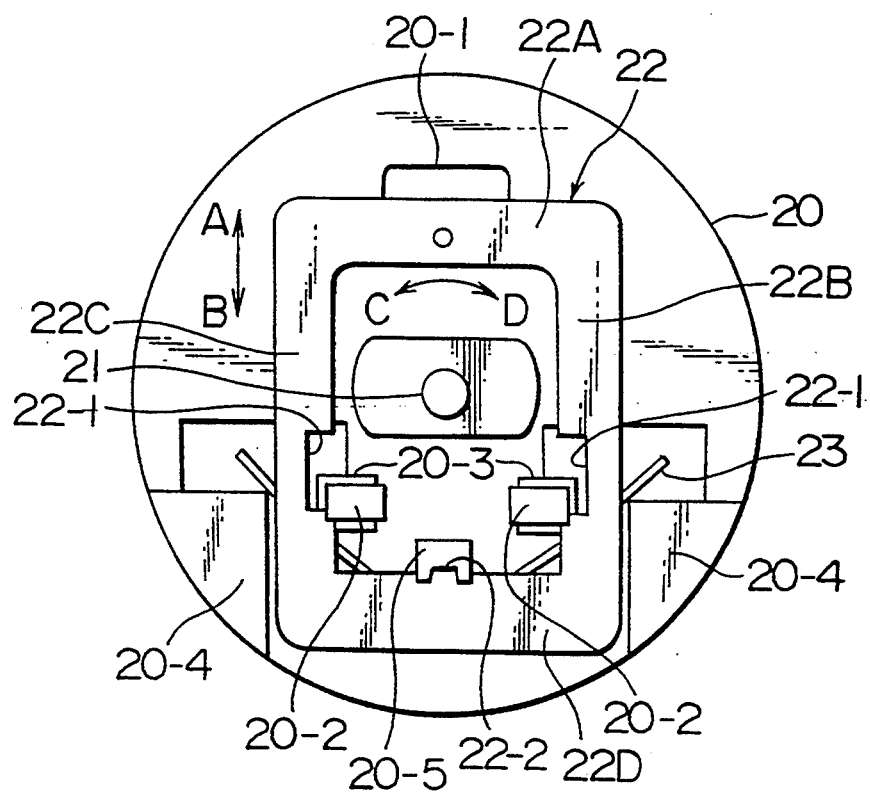
FIG. 4 is a plan view of an assembly of the disk holder table illustrated in FIG. 3 and a holder ring.

In FIG. 4, the internal edges of the second and the third sides 22B and 22C of the holder ring 22 and the hooks 20-2 are engaged with each other. The disk holder table 20 has a pair of guide portions 20-4 formed at the bottom surface thereof in the vicinity of the hooks 20-2. The guide portions 20-4 are extended along the external edges of the second and the third sides 22B and 22C of the holder ring 22 and spaced from each other at a distance slightly wider than that between the external edges of the second and the third sides 22B and 22C of the holder ring 22. The guide portions 20-4 have a thickness greater than that of the remaining portions of the disk holder table 20. With this structure, the guide portions 20-4 serve to guide the sliding movement of the holder ring 22 along a direction depicted by an arrow A–B in FIG. 4. The guide portions 20-4 also serve as restricting protrusions which allow the holder ring 22 to rotate within a restricted range in a direction depicted by an arrow C–D in FIG. 4. The disk holder table 20 is further provided with an elongated hole 20-5 at a position corresponding to the protrusion 22-2 of the holder ring 22. The elongated hole 20-5 is for guiding the sliding movement of the holder ring 22 along the direction A–B while the protrusion 22-2 is inserted in the elongated hole 20-5. With the above-mentioned structure, the drive roller 25 is movable within the aperture 20-1.

The holder ring 22 is assembled to the bottom surface of the disk holder table 20 by the use of the notches 22-1. After the notches 22-1 are positioned so as to receive the hooks 20-2 therein, the holder ring 22 is slid so that the hooks 20-2 are released from the notches 22-1 and shifted to the outside of the notches 22-1. Thus, assembling is carried out between the holder ring 22 and the bottom surface of the disk holder table 20. The holder ring 22 is urged in the direction A in FIG. 4 by a rod spring 23 held by the protrusion 22-2 and by the corners of the guide portions 20-4. As a result, the holder ring 22 is brought in a state where the hooks 20-2 are engaged with the second and the third sides 22B and 22C. At that time, the protrusion 22-2 is engaged with an internal end edge of the elongated hole 20-5 that is positioned in the vicinity of the rotation axis of the disk holder table 20. For convenience of description, the holder ring 22 is shown at a position shifted in the direction B in FIG. 4. In other words, the drive roller 25 mounted on the holder ring 22 is engaged at an internal edge of the aperture 20-1 that is positioned in the vicinity of the rotation axis.

With such an assembling structure described above, the holder ring 22 is attracted to the bottom surface of the disk holder table 20. Even if the attraction is released, the holder ring 22 is retained because it is engaged by the hooks 20-2. Furthermore, the holder ring 22 is urged by the rod spring 23 in the direction A in FIG. 4. Accordingly, engagement between the hooks 20-2 and the internal edges of the second and the third sides 22B and 22C is not released. Therefore, the holder ring 22 can be assembled to the disk holder table 20 without using any additional coupling member such as a support pin. In addition, the holder ring 22 is rendered slidable within a restricted range along the bottom surface of the disk holder table 20.

Figure 6:
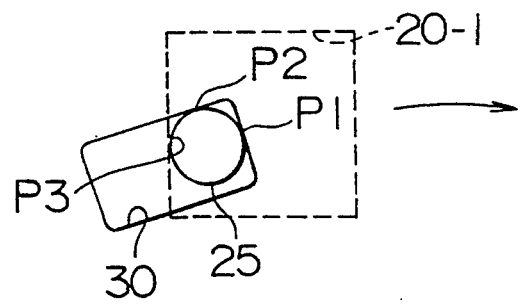
FIG. 6 is a view for describing the relationship among a drive roller of the disk driver according to this invention, an aperture formed in the disk holder table of the disk driver, and a driving hole formed in a disk hub of a magnetic disk.

FIG. 6 shows the relationship among the drive roller 25, the aperture 20-1 of the disk holder table 20, and a driving hole 30 formed in a disk hub of a magnetic disk received by the disk holder table 20. When the rotation of the disk holder table 20 is started in the direction depicted by an arrow in the figure, the drive roller 25 is inserted into the driving hole 30. At this time, the drive roller 25 is in contact with the rear edge of the aperture 20-1 with respect to the rotating direction. Then, the drive roller 25 is moved in the direction depicted by the arrow in contact with a first point P1 at the front edge of the driving hole 30 with respect to the rotating direction, a second point P2 at the external edge of the driving hole 30 and angularly spaced by 90° from the first point P1, and a third point P3 at the rear edge of the aperture 20-1. As a result, the drive roller 25 is kept at a position defined by the first through the third points P1 to P3 to drive the rotation of the magnetic disk.

With the above-mentioned structure, the holder ring 22 is attracted to the bottom surface of the disk holder table 20 by magnetic attractive force of the disk holder table 20. In addition, if the holder ring 22 is released from the attraction to the bottom surface of the disk holder table 20, the holder ring 22 is prevented by the hooks 20-2 from dropping off. In addition, the holder ring 22 for holding the drive roller 25 can be assembled to the disk holder table 20 without using any additional coupling member such as a support pin. It is therefore possible to reduce the number of parts required. Since any support pin for supporting the holder ring is unnecessary as described above, a caulking step is not required. Thus, the number of assembling steps can be reduced also.

Figure 7:
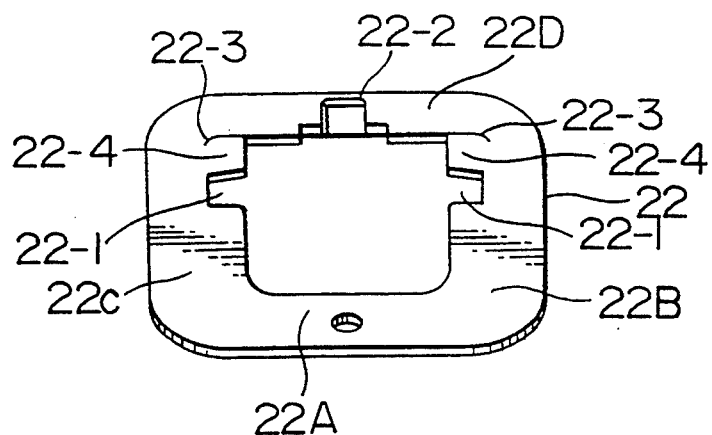
FIG. 7 is a perspective view of a modification of the holder ring in the disk driver according to this invention.

FIG. 7 shows a modification of the holder ring 22 according to another embodiment. The holder ring 22 has the first side 22A for mounting the drive roller 25, the second and the third sides 22B and 22C adjacent to the first side 22A, and the fourth side 22D opposite to the first side 22A, like the above-mentioned embodiment. This holder ring 22 has a pair of tongues 22-4 formed at internal corners between the fourth side 22D and the second and the third sides 22B and 22C by forming a pair of slits 22-3 extending in parallel to the fourth side 22D. The tongues 22-4 are slanted with respect to the plane of the holder ring 22 to protrude upwards, namely, in a direction similar to the protruding direction of the protrusion 22-2. The tongues 22-4 serve to prevent vertical chattering of the holder ring 22 due to presence of a small gap between the second and the third sides 22B and 22C of the holder ring 22 and the hooks 20-2 as seen from FIG. 5. In addition, the holder ring 22 is easily assembled to the disk holder table 20 together with the rod spring 23 because the rod spring 23 is held by the tongues 22-4.

What is claimed is:

1. A disk driver comprising a disk holder table for holding a disk having a disk hub made of metal and provided with a driving hole formed at a position eccentric with the center of the disk to receive a drive roller therein, wherein said disk holder table comprises a plastic magnet provided with an aperture formed at a position eccentric with the center thereof, said disk holder table having a bottom surface to which a holder ring made of metal and having a generally rectangular shape is assembled to hold said drive roller so that said drive roller is upwardly projected through said aperture, said holder ring being engaged by a pair of hooks formed on the bottom surface of said disk holder table with a space left between said holder ring and the bottom surface of said disk holder table, said holder ring being rotatable in parallel to the bottom surface of said disk holder table within a range restricted by restricting protrusions formed on the bottom surface of said disk holder table, said holder ring being urged in a predetermined direction by a spring member placed on the bottom surface of said disk holder table.

2. A disk driver as claimed in claim 1, wherein said drive roller is mounted on one side of said holder ring, said holder ring being engaged through said pair of hooks with peripheral edges of two adjacent sides of said holder ring adjacent to said one side, said holder ring having a protrusion which is formed at a peripheral edge of an opposite side of said holder ring opposite to said one side to protrude towards the bottom surface of said disk holder table and which is adapted to hold said spring member, said disk holder table being provided with an elongated hole for receiving said protrusion and for guiding said protrusion in a direction identical with said predetermined direction.

3. A disk driver as claimed in claim 2, wherein said two adjacent sides adjacent to said one side are provided with notches formed at the internal edges thereof to allow insertion of said pair of hooks, respectively, said spring member being for urging said holder ring in said predetermined direction so that said pair of hooks are engaged at the outside of said notches with said two adjacent sides adjacent to said one side.

4. A disk driver as claimed in claim 3, wherein said holder ring has a pair of tongues formed at corners between said two adjacent sides adjacent to said opposite side by forming a pair of slits in said corners to extend in parallel to said opposite side, said tongues being slanted to protrude in a direction similar to the protruding direction of said protrusion.

* * * * *